United States Patent [19]

Thiel

[11] 4,257,337
[45] Mar. 24, 1981

[54] SILICON CARBIDE FURNACE SIDE FRAMES

[76] Inventor: Robert C. Thiel, P. O. Box 716, Niagara Falls, Ontario, Canada, L2E 6V5

[21] Appl. No.: 21,662

[22] Filed: Mar. 19, 1979

[30] Foreign Application Priority Data

Mar. 15, 1979 [CA] Canada ................................. 323483

[51] Int. Cl.$^3$ .............................................. F23M 5/00
[52] U.S. Cl. .................................... 110/336; 423/345; 432/93
[58] Field of Search .................. 110/336, 337; 432/62, 432/93, 232, 247; 34/218, 233, 234; 423/345

[56] References Cited

U.S. PATENT DOCUMENTS

| 3,647,384 | 3/1972 | Dessureault | 423/345 |
| 3,836,318 | 9/1974 | Desty et al. | 431/202 |
| 4,136,465 | 1/1979 | Wilson | 34/233 |

Primary Examiner—Edward G. Favors
Attorney, Agent, or Firm—Rogers, Bereskin & Parr

[57] ABSTRACT

A side for a furnace used in the manufacture of silicon carbide from silicon dioxide and carbon comprises a plurality of gates which are removably affixed to the furnace or plant floor. Each gate has a base portion intended to be supported by a plant floor and a plurality of upstanding supports. Affixed to each of the upstanding supports are a series of vanes which vanes are sloped downwardly and inwardly toward the center line of the furnace. The width, configuration and vertical spacing between vertically adjacent vanes are all chosen such that the silica sand and carbon mixture cannot flow outwardly through the side of the furnace under the effects of gravity while at the same time gases produced during the reaction may flow readily outwardly through the furnace sides.

5 Claims, 3 Drawing Figures

SILICON CARBIDE FURNACE SIDE FRAMES

This invention relates to side members constituting a furnace for heating flowable granular substances such as may be required when manufacturing silicon carbide from silica sand and usually petroleum coke.

Silicon carbide is manufactured in commercial quantities by heating silica sand together with carbon by means of passing an electrical current through the mixed sand and carbon. The chemical reaction results in the production of silicon carbide and carbon monoxide. The overall chemical reaction for the production of silicon carbide is as follows:

$$SiO_2 + 3C = SiC + 2CO$$

The reaction is carried out at extremely high temperatures, often exceeding 2,000° C. Accordingly, there are large volumes of carbon monoxide gas formed during the reaction and the furnace must be designed so as to permit the release of this gas.

In typical installations in use today, the furnace is a relatively open furnace having no top. Large end walls having electrodes implanted therein are located in an open factory area. The silica sand and carbon is placed in a relatively large elongated pile between the electrode ends and supported in place by means of removable furnace sides. When sufficient electrical power is applied to the electrodes the reaction occurs and large volumes of carbon monoxide gas are produced. After the reaction has finished the pile is allowed to cool. After the furnace sides are removed, the silicon carbide and any unreacted sand are removed from the furnace area using industrial tractors and like equipment.

The silicia sand which is used in this reaction is typically high purity silica and is very readily flowable material and may be particularly fine grained. As the gas is produced in the area of the centre of the pile through which the electrical current is passed, the gas must expand upwardly until it is released from the pile. On frequent occasions the expansion of the gas upwardly causes "blows". "Blows" is the term used to express the phenomenon where the gas rather than escaping uniformly from the pile erupts from the pile and removes excessive quantities of fine particulate from the pile. The sand and dust removed from the pile by the blow is then free to circulate throughout the air in the furnace area and causes severe pollution control problems within and without the plant.

Many attempts have been made to control the pollution problems created by such "blows". It is obvious that the conventional furnace cannot be totally enclosed as to do so would render it commercially difficult to place the silica sand and remove the silicon carbide from the furnace. In addition such a furnace would likely be required to withstand substantial pressures created by the hot expanding gases. In the past, attempts have been made to ventilate the side of the furnace although no such satisfactory means to accomplish this has been developed.

Typically the side of the furnace may be made of refractory brick, concrete or like structural members. Typically, the sides are readily removable in order that after the reaction has taken place the sides may be removed from the furnace and industrial tractors or clam shell buckets or the like can be used to remove the silicon carbide and residue material. As these prior art sides are substantially solid no appreciable quantity of gas can be passed through the sides and the vast majority of the expanding gases must be released from the reacting pile by passing upwardly through the sand and coke mixture. Attempts have been made to ventilate the sides of the furnace by providing small holes through the sides. While such ventilated sides have lessened the problem of blows they have not been able to substantially reduce the occurrence of such blows as there is still insufficient gas able to pass outwardly through the sides.

According to this invention a furnace side comprises a plurality of gates each of which has a base portion intended to be supported by the plant floor and wherein each such gate comprises a plurality of upstanding supports and supported upon these supports are a series of vanes; means are provided to removably locate the gates where required so as to constitute a furnace; the vanes of each such gate are angled downwardly and inwardly towards the centre line of the furnace and the width, configuration and vertical spacing between vertically adjacent vanes are all chosen such that the silica sand and carbon mixture cannot flow outwardly through the sides under the effect of gravity when the gate is in its desired location. However, by virtue of spacing between the vanes, gases may readily move outwardly through the furnace sides.

The invention will be more fully understood by reference to the accompanying drawings which illustrate a preferred embodiment of the invention and in which.

Figure 1:
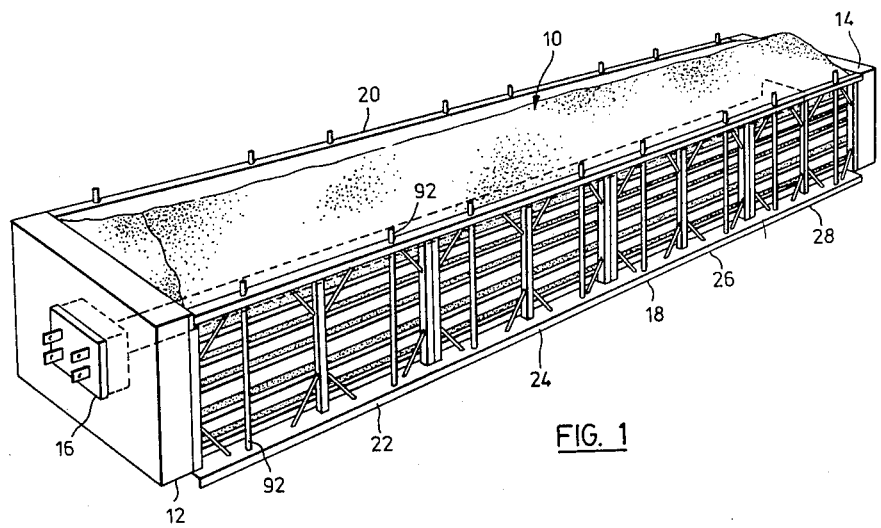
FIG. 1 is a perspective view of an assembled silicon carbide furnace having sides comprising a plurality of gates made according to this invention.

FIG. 1 illustrates a silicon carbide furnace indicated generally as 10 filled with silica sand and coke and revert mix immediately prior to connection of the source of electrical energy. The furnace 10 comprises two ends 12 and 14. Ends 12 and 14 are in most cases permanent structures affixed to the plant floor and are most advantageously made from concrete or similar suitable refractory material. As illustrated in FIG. 1, end 12 contains means 16 for connecting to a suitable means of electrical energy. Although not visible in FIG. 1, end 14 will also have a similar electrical connection means.

Furnace 10 also comprises two sides indicated generally as 18 and 20. Sides 18 and 20 are similar and include a plurality of gates 22, 24, 26 and 28. The furnace illustrated in FIG. 1 comprises four such gates constituting each of sides 18 and 20. However, it will be obvious that the number of gates comprising a side is purely a matter of choice depending upon the length of furnace required.

Figure 3:
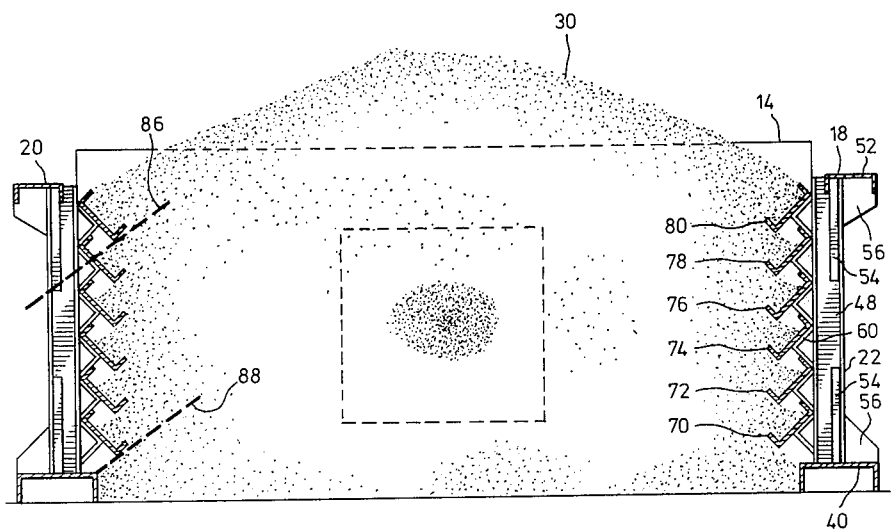
FIG. 3 is a vertical cross-section through the furnace of FIG. 1 illustrating the vanes of the gates constructed in accordance with this invention.

As shown in FIG. 3 the furnace is filled with granular aggregate illustrated generally as 30. The central portion shown in the rectangular dotted configuration is usually arranged to be graphite in powdered form. This graphite "core" is arranged to align with the electrical connection means 16 so as to form an electrode which runs the full length of the aggregate at approximately the central portion thereof.

Figure 2:
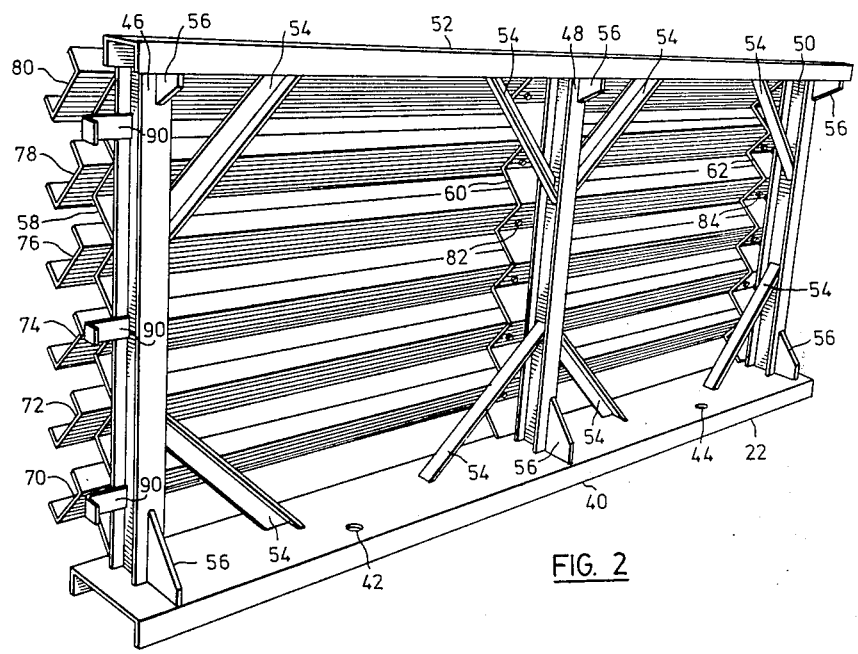
FIG. 2 is a perspective view of one of the gates constituting the side members of the furnace shown in FIG. 1.

FIG. 2 illustrates in greater detail the gate 22. It should be understood that each of the gates 22, 24, 26 28 and the four gates constituting the side 20 of the furnace are each substantially the same. Gate 22 comprises a base portion 40 which merely rests on the plant floor. Base portion 40 may most conveniently be manufactured from a relatively heavy walled channel member. Base member 40 contains two apertures 42 and 44 the purpose of which will be explained hereinafter. Gate 22 comprises three upstanding supports 46, 48 and 50 fabricated of conventional I-beams. A top channel member 52 is also affixed to the upstanding supports to provide a rigid frame to the gate. Upstanding supports 46, 48 and 50 are braced to the base member 40 and the top member 50 respectively by angular braces 54 at top and bottom. In addition, the upstanding supports are further affixed to the base 40 and the top member 52 by means of gusset plates 56. It will be observed that the gate is thus a substantially rigid structure and can support the loads imposed upon the sides by the weight of the aggregate loaded into the furnace.

Affixed to each of the upstanding supports 46, 48 and 50 respectively are angular mounting means 58, 60 and 62. Each of the aforesaid angular mounting means can most readily be attached to the upstanding support as by welding. The angular mounting means can be most readily constructed by cutting a series of sections from a 90° angle iron each section having the length of the width of the upstanding supports 46, 48 and 50. A 90° angle iron will be relatively readily available.

The gate 22 comprises six vanes 70, 72, 74, 76, 78 and 80 arranged in parallel spaced relationship. As shown in FIG. 2 each of these vanes extends generally horizontally the full length of the gate 22. Each vane is affixed to the angular mounting means 60 and 62 by bolts 82 and 84. Each of the vanes is also similarly bolted to angular member 58 although these bolts are not visible in the view shown in FIG. 2. Each of the vanes is readily removable from the gate 22 by means of undoing the three bolts. The vanes may be removed or replaced as and when required.

Each of the vanes may most readily be constructed from relatively thick walled channel steel. As the vanes will be subjected to the extremely high temperatures developed within the mix and must support the outwardly directed force of the pile of mix they must be of relatively heavy construction. Although flat steel could be used, it is suggested that the channel shaped member described above is the most desirable as having the greatest strength at the temperatures to which these vanes are subjected. It is also advantageous to use a U-shaped channel vane as indicated as the inner surface of the vane may be readily lined with refractory brick if desirable to lengthen the line of the vanes.

Each of the vanes of gate 22 slope downwardly and inwardly toward the centre of the furnace. As is best illustrated in FIG. 3 the sand is retained in the furnace by the side 22 as the sand cannot flow outwardly through the vanes under the force of gravity alone. In FIG. 3 at the left side parallel dotted lines 86 and 88 are shown. Line 86 is drawn parallel to the angle of repose of the mix through the lowermost point of the uppermost vane. A similar parallel line 88 is drawn through the lowermost point of the lowermost vane. Similar lines can be drawn for each of the vanes. It will be observed that the width of the channel members, angle of inclination and vertical spacing between each of the vanes is chosen such that each line intersects the base 40 or the next lower vane. The mix will lie against the sloped surface of each vane assuming its usual angle of respose. Thus, the mix which is a freely flowing granular material will not under the effect of gravity alone flow outwardly through the vanes. However, gas formed within the mix may flow outwardly and upwardly between the vanes without restriction. The lower upwardly and inwardly directed web of the channel member forming each vane assists in preventing any mix from spilling out through the gate 22. However, it will be appreciated by examining FIG. 2 that there is a relatively large open area between adjacent vanes which permits gas to flow upwardly and outwardly through the gate 22 throughout its length.

Side 18 as previously stated comprises a number of gates. Stops 90 (FIG. 2) on each gate serve to align the various gates so as to form substantially continuous vanes extending the length of the furnace without gaps between each vane. Gate 22 is fitted against a corresponding surface of end 12. Vertical bars 92 (FIG. 1) are inserted through apertures in the top member 52 and the apertures 42 and 44 previously described. The bars 92 project into suitable anchor holes located at appropriate places within the plant floor. Thus, when the anchor bar 92 is inserted through the top and lower members, the gate 22 is fixed to the plant floor and can support the outward pressure of the aggregate 30 when the furnace is filled. After the electrical current has been passed through the silica and carbon mixture for the required reaction the gates may be removed by simply raising anchor bars 92 upward so as to release the gate from the floor. Once the gates 22, 24, 26 and 28 have been removed the silicon carbide and unreacted material may be removed from the furnace and transported as desired using ordinary construction equipment.

While the vanes as described herein are shown as being U-shaped or channel members, it will be obvious to those skilled in the art that such vanes may have any suitable configuration. As some mix will be retained in the U-shaped member when the gate is removed from the furnace it may be desirable to use a Z-shaped member with a down turned flange rather than an upwardly and inwardly turned flange at the bottom of each vane. However, such material is not as readily available as the U-shaped channel suggested herein. The width of each of the vanes may also be varied as may the angle of the vanes as long as the width and vertical spacing between the vanes is such that the granular sand will not flow outwardly through the gate.

What I claim is:
1. A furnace side member for retaining a flowable granular substance in the furnace comprising:
   (a) a base portion
   (b) a plurality of upstanding supports affixed to said base portion
   (c) a plurality of vertically spaced vanes supported by said upstanding supports
   (d) said vanes sloping downwardly and inwardly toward said granular substance; the spacing between said vanes and the configuration of said vanes being chosen such that the granular substance will not flow outwardly through said side member under the effect of gravity, but gases may flow unrestrictedly upwardly and outwardly between said vanes.

2. A furnace side member for retaining a flowable granular substance in the furnace comprising:
   (a) a base portion (b) a plurality of upstanding supports affixed to said base portion (c) a plurality of vertically spaced substantially horizontally extending vanes sloping downwardly and inwardly toward said granular substance said granular substance having an angle of repose (d) said vanes having a configuration and vertical spacing such that a line parallel to said angle of repose passing through the lowest point of any of said vanes passes below the uppermost portion of the next lower vane or said base portion.

3. A movable side wall for a furnace adapted to create silicon carbide from a flowable granular substance comprising a plurality of removable gates at least one of said gates comprising:

(a) a base portion (b) a plurality of upstanding supports affixed to said base portion (c) a plurality of vertically spaced substantially horizontally extending vanes sloping downwardly and inwardly toward said granular substance said granular substance having an angle of repose (d) said vanes having a configuration and vertical spacing such that a line parallel to said angle of repose passing through the lowest point of any of said vanes passes below the uppermost portion of the next lower vane or said base portion.

4. The device of claim 1, 2 or 3 wherein said vanes are U-shaped channel members.

5. The device of claim 1, 2 or 3 wherein said vanes are lined with refractory material.

* * * * *